Jan. 28, 1936.   C. G. BRIEL   2,028,862
METHOD OF PRODUCING COMPOSITE PICTURES
Filed Oct. 12, 1931
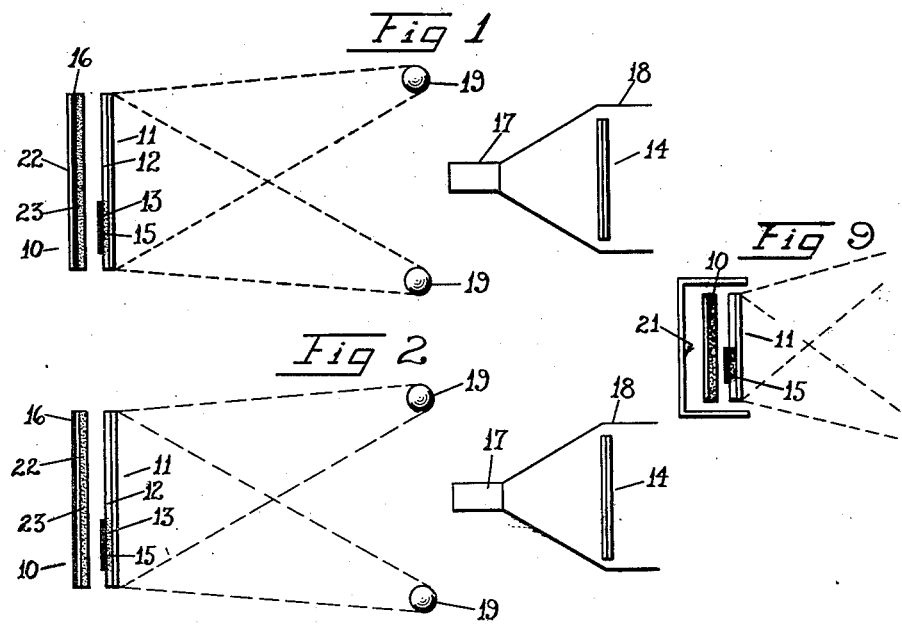
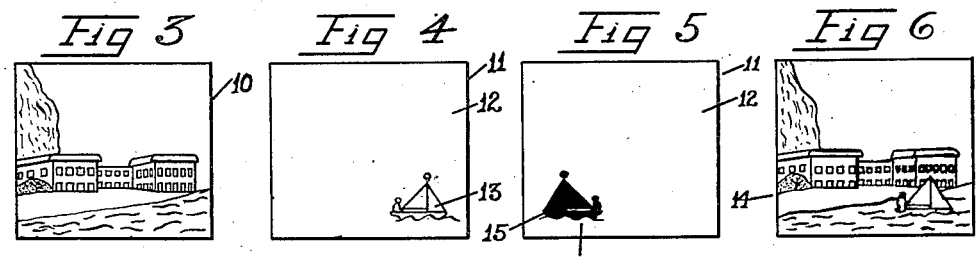
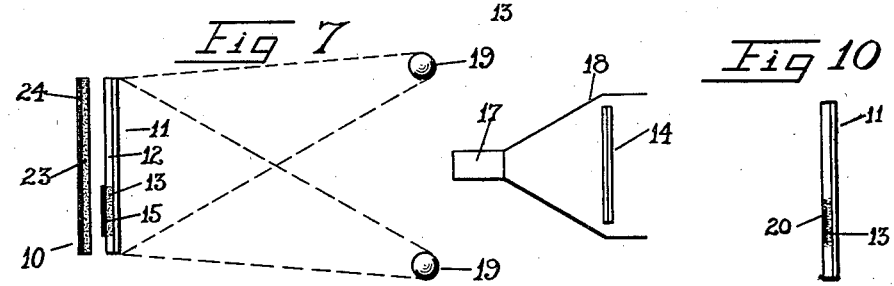
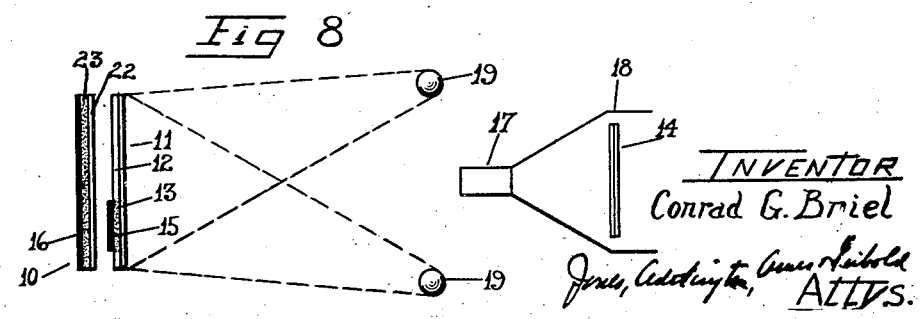
INVENTOR
Conrad G. Briel
ATT'YS.

Patented Jan. 28, 1936

2,028,862

UNITED STATES PATENT OFFICE 2,028,862

METHOD OF PRODUCING COMPOSITE PICTURES

Conrad G. Briel, Chicago, Ill., assignor to Cinema Development Company, Chicago, Ill., a corporation of Illinois Application October 12, 1931, Serial No. 568,384

11 Claims. (Cl. 88—16)

This invention relates to a method of producing composite pictures in photography.

More particularly, this invention relates to a method of producing composite photographs embodying two or more component parts, that includes placing the components in superposed relation and illuminating them with light with which they are respectively illuminable, and by a single exposure producing a composite picture.

The desirability of producing composite photographs is particularly marked in the motion picture art, but the invention herein described is not limited to this art alone but may be used generally in photography. Two or more original scenes or components may be composed into a single picture by the use of film transparencies, one comprising a selected background and the other comprising a selected foreground action, which are superposed and photographed, broadly both components having their images rendered sufficiently opaque to but reflective of light, the specific disclosure including, however, a coating, or like element, applied to the images, either manually, mechanically, chemically or photographically, which imparts to the images the desirable characteristic of opacity, while the images may be either chemically treated, or otherwise provided, to be reflective of light, so that when both components are superposed and illuminated by reflection, a composite photograph may be produced.

Specifically, I have found that if the ordinary black and white diapositives are used, the silver images may be treated, if so desired, say by bleaching to a whiteness, to be reflective of light. A coating may be then applied to secure the opacity desirable and illumination by reflection of both the background and the foreground components obtained. As specifically described and claimed in my co-pending application, Serial No. 532,840, filed April 25, 1931, the coating on the foreground, or, in fact, on both components, as described in the present case, may be obtained by treating the images after they have been bleached to a whiteness, as by partly redeveloping the film. This will provide a backing on the images which will be sufficiently opaque to transmitted light.

In this case, transmitted light is not employed to illuminate the background, as disclosed in said copending application, but after both components are arranged in superposed relation, they are illuminated by reflection, which advantageously permits accurate contrast control and provides for an accurate, rapid and inexpensive method of producing composite pictures.

In order to apprise those skilled in the art how to practice my invention, I shall now describe several preferred embodiments thereof in connection with the accompanying drawing which forms a part hereof.

In the drawing:

Figure 1 illustrates one of the various ways of placing a treated foreground film adjacent to a treated background film, and controlling the illumination to permit photographing by a single exposure;

Fig. 2 is a similar illustration showing an alternative embodiment of the present invention;

Fig. 3 is a front elevation of a positive background scene, the film being that usually employed in photographing and having its image made reflective of light and provided with an opaque and non-actinic coating over the entire film on one side, thus making the image negative in character;

Fig. 4 is a positive image on a film to be used as a foreground, the image having been made reflective of light and provided with an opaque and non-actinic coating over the image area, producing thereby an image negative in character;

Fig. 5 is the same treated image shown in Fig. 4, but looking at the opposite or emulsion side to show the opaque and non-actinic coating over the image;

Fig. 6 illustrates a finished positive composite picture carrying the images of the foreground and the background thereon as a complete picture;

Figs. 7, 8 and 9 illustrate additional alternative embodiments of the invention; and Fig. 10 illustrates a foreground film having its image made opaque by treating the image itself.

The components used may be the usual black and white diapositives, such as the ordinary cinema projecting film, or plates used in still photography, or they may be paintings, depending upon the characters or images to be combined and the superposing to be done.

When the extensively used present-day film is developed, the images are formed by fixation of innumerable minute particles of metallic silver embodied in the gelatin of the photographic emulsion, there being relatively more silver particles in the shadows than in the high-lights, but somewhat uniformly distributed throughout the depth of the photographic emulsion.

The present invention is very well adapted to this type of photographic film, but it will be understood that the invention might well be applied to other film where the images are produced in a different manner or have different physical characteristics.

As shown in the drawing, the background may be scenery, or other objects in the form of a painting or photographic film, a positive print 10 of the background being shown in Fig. 3.

As a specific example, the foreground film 11 shown in Fig. 4 also may be a painting or the usual diapositive, such as the ordinary cinema projecting film, having the area 12 about the image 13 transparent and the image 13 comprising metallic silver imbedded in the photographic emulsion carried by the base of the film. The action or objects, of which foreground image 13 is composed, may be photographed in front of a white ground, so that, when a positive print is made from the negative, the area about the image will be transparent or relatively free from silver deposit.

While one of the features of the present invention resides in making the background image and the foreground image varyingly reflective of light, it will be understood that the same results may be accomplished where these images are either inherently reflective of light or have otherwise been previously treated to be reflective of light for any purpose whatsoever. This step may be accomplished by bleaching the silver image in any well known way so that the images will be changed into a light figure or into a substance which reflects light.

I do not wish to be limited to the particular way the invention is accomplished, but suggest bleaching these images to a whiteness as one method of obtaining the desired results, the density of the whiteness varying according to the density of the metallic silver, with a corresponding variation of reflectivity for light to effect a correct reproduction of the images and their details when photographed upon film 14.

Bleaching a silver image on a film is a step well known in the art. As an example, I suggest the use of a re-agent comprising mercuric chloride and potassium bromide, which changes the metallic silver into a complex silver mercury bromide. The density of the image may be somewhat built up in the bleaching action, but this is not necessary for the purpose of the present invention, because it may be said that it is quite desirable to control the intensification of the image and even restrict it as much as possible so that the density and contrast of the image will remain quite uniform throughout the steps of the process.

A relatively opaque or non-actinic coating 15 may then be applied to foreground image 13, and a similar coating 16 may be applied to the rear surface of background film 10. By the term "rear surface" I mean the surface that is away from and not facing lens 17 of camera 18. Both coatings 15 and 16 may be applied to the images of the foreground and background components, either manually, mechanically, chemically, optically, photographically, or electrolytically.

Figure 5 illustrates the bleached image 13 after it has been coated by opaque substance 15, and is a view looking at the emulsion side of the foreground film 11 to show that this coating 15 may be applied to the image upon the emulsion side, although not necessarily so, inasmuch as it may be applied to the base side when the occasion may require it. Opaque or non-actinic coating 16 may be applied to background component 10 in many different ways, as shown in Figs. 1, 2, 7 and 8, and as will be later explained.

The next step in the method herein disclosed consists in placing both background component 10 and foreground component 11, after they have been bleached and treated, in superposed relation.

As illustrated in the drawing, background component 10 and foreground component 11 need not be in actual contact but may be arranged in suitable position and in one focal plane of lens 17 of camera 18, while unexposed film 14 may be arranged in the other focal plane of the lens 17. By proper lighting effects, these films may be illuminated so that they may be photographed by camera 18 or otherwise exposed to film 14 and a composite picture produced upon film 14, which in this case will be a positive. The particular step of illuminating films 10 and 11 may be varied from that shown in the drawing, but, as illustrated, it is preferred to use a light or lights 19 to illuminate the background component 10 and the foreground component 11 by reflected light. The illuminating light or lights 19 may be placed in any suitable position to secure the desired results. It is possible to space the components a suitable distance apart and employ separate illuminators for illuminating background component 10 and foreground component 11. If an arrangement is used which is shown in the drawing, the rays of light from illuminators 19 will pass through the clear area 12 of foreground component 11, strike the image of background component 10 and be reflected back through this clear area 12 of film 11, except where the foreground image 13 appears thereon, thereby effecting illumination of the background component by reflection. Coating 15 serves to prevent the passage of reflected light from the background film 10 through the foreground image area, while the bleaching of the foreground image presents the effect of varyingly reflecting the rays of light from illuminators 19 so that the details of the foreground image 13 will also appear clear and distinct in the composite picture of film 14.

The particular relative arrangement of background component 10 and foreground component 11 may vary with respect to each other, but specifically the emulsion sides of these films may face each other as shown in Fig. 1, the emulsion side of film 11 being away from lens 17 and the celluloid side of film 11 facing this lens.

Bleaching the images of the background positive 10, as shown in Fig. 3, and the image of the foreground positive 11, as shown in Fig. 4, causes in effect a change of the positives into negatives, which will result in film 14 being a positive, as shown in Fig. 6. Film 14, as shown in Fig. 6, illustrates a complete composite picture of the images shown in the background and the foreground film illustrated in the drawings. The character of coatings or backings 15 and 16 required to accomplish the herein desired results need only be such as will be relatively opaque or opaque and non-actinic, that is to say, absorptive of light rays. They may be of any color, although I desire that coatings 15 and 16 be somewhat dark or have less actinic value than the images. Although I have illustrated in the drawings coatings for securing opacity and varying light reflectivity, it will be readily understood that the same effects may be obtained by other methods or means without departing from the scope of the invention.

In so far as the steps of bleaching and the use of coatings are concerned, it is evident to one skilled in the art that they may be varied or modified considerably without departing from the broad concept of my invention. Producing composite pictures with the present method is extremely simple, rapid and inexpensive, because it eliminates the use of mats and tedious blocking out, as practiced in the methods heretofore known.

When more broadly considered, the invention is not to be limited to the initial step of bleaching the images to a whiteness, because it is obvious that the same results may be had, where these images either are inherently reflective of light or have otherwise been previously treated to be reflective of light for any purpose whatsoever, so that the necessary opacity may be subsequently obtained by the treatment of the images or the application of relatively opaque or non-actinic coatings thereto.

As one example, the necessary opacity of the foreground image 13 may be subsequently obtained by the treatment of the image in a manner disclosed and claimed in the aforesaid copending application, wherein foreground film 11 may be redeveloped so that the image 13 will be partly redeveloped to provide an opaque backing 20 on this image, as shown in Fig. 10. In certain instances, it might be likewise desirable to treat the background film in like manner to secure varying reflectivity to show image detail.

It is found that the same results may be obtained, in the combination herein disclosed, without applying an opaque coating 16 to the background component 10. Such an arrangement is shown in Fig. 9. The background component 10 is arranged in this particular case in superposed relation with foreground film 11 and within a compartment having non-actinic walls 21, so that the rays of light from the illuminators 19, which are not reflected back by the image on the background component, are absorbed, in the same manner as where coating 16 is employed, in order to show by reflection the details of the background image.

In instances where coating 16 is employed, it may be applied to the background component 10 in a number of different ways, as illustrated in Figs. 1, 2, 7 and 8.

In Fig. 1, coating 16 is arranged in optical contact with the bleached background image and as a substratum over the entire film between the celluloid base 22 and the emulsion 23. If the emulsion of the background film 10 and the foreground film 11 face each other, as shown in Fig. 2, coating 16 may also be applied over the entire area of the celluloid base 22 so that the background image is spaced from this opaque coating 16 by the celluloid base 22.

It will be understood that although I have described the present invention in connection with the standard photographic film, wherein the sensitive photographic material is carried upon a base, such as celluloid, any type of film may be used and a celluloid base is not essential. In Fig. 7, the emulsion is shown carried upon a base of black material 24. This material may be any suitable substance, such as paper, and may serve the same purpose as coating 16.

In Fig. 8, I have shown an arrangement embodying the application of coating 16 to the emulsion 23 of background component 10 so that the celluloid base 22 is arranged to face the foreground component 11.

In the drawing, the photographic emulsion is shown considerably thicker in cross section than the celluloid base contrary to the actual proportions generally used in the ordinary photographic film, but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a composite photograph of the images on two component film transparencies which includes making the images on both transparencies substantially opaque to but reflective of light to show the image details, superposing the two transparencies and illuminating the images by reflected light, and exposing a fresh actinic surface to both images so illuminated and superposed.

2. The method of producing a composite photograph of the images on two component film transparencies which includes making the images on both transparencies substantially opaque to but reflective of light to show the image details, superposing the two transparencies and illuminating the images by light with which they are respectively illuminable, and exposing a fresh actinic surface to both images so illuminated and superposed.

3. The method of producing a composite photograph of the images on two component film transparencies which includes providing one of the transparencies substantially opaque to but reflective of light, making the image on the other transparency substantially opaque to but reflective of light, superposing the two transparencies and illuminating the images by light with which they are respectively illuminable, and exposing a fresh actinic surface to both images.

4. The method of producing a composite photograph of the images on two films which includes chemically treating the images of both films and thereby producing images of a light reflective character, further treating the images to produce backings thereon which are relatively non-actinic to light, superposing the two films and illuminating the images by reflected light, and exposing a fresh actinic surface to the two images so illuminated and superposed.

5. The method of producing a composite photograph embodying two component parts which includes making photographic silver deposit images of the two components surrounded by clear grounds, chemically transforming the silver deposits of said images and thereby producing images of a light reflective character, providing relatively non-actinic backings for said images, superposing the two images and illuminating them by reflected light, and exposing a fresh actinic surface to the two images so illuminated and superposed.

6. The method of producing a composite photograph embodying two components which includes providing photographic images of both components, treating the images of both components, including the provision of backings for the images, to make them opaque to but reflective of light, superposing the two images and illuminating them by reflected light, and exposing a fresh actinic surface to the two images so illuminated and superposed.

7. The method of producing a composite photograph embodying two components which includes providing photographic images of both components, bleaching the images to a substantial whiteness, providing substantially non-actinic backings for the images, superposing the two images and illuminating them by reflected light, and exposing a fresh actinic surface to the two images so illuminated and superposed.

8. The method of producing a composite photograph of the images on two component film transparencies, one appearing as a foreground and the other as a background upon the composite, which includes making the photographic images on both transparencies illuminable by reflected light, superposing the two transparencies and illuminating the images by reflected light, and exposing a fresh actinic surface to the two images so illuminated and superposed.

9. The method of producing a composite photograph embodying two component parts, one appearing as a foreground and the other as a background upon the composite, which includes making photographic images of both components, chemically treating the two images to transform them into images of a light reflective character, providing a non-actinic backing for the image of the foreground component, providing a non-actinic backing at the rear and over the entire surface of that portion of the background component which is to be illuminated, superposing the two images and illuminating them, and exposing a fresh actinic surface to the superposed images.

10. The method of producing a composite photograph embodying two component parts, one appearing as a foreground and the other as a background upon the composite, which includes making photographic silver deposit images of both components, chemically transforming the silver deposits of the images and thereby producing images substantially opaque to but reflective of light to show their image details, superposing the images and illuminating them by reflected light, and exposing a fresh actinic surface to the images so superposed and illuminated.

11. The method of producing a composite photograph of the images on two component film transparencies which includes superposing the images on the two transparencies, both of the images being opaque to but reflective of light, illuminating the images by reflected light, and exposing a fresh actinic surface to the images.

CONRAD G. BRIEL.